United States Patent
Nishiwaki et al.

(10) Patent No.: US 9,513,619 B2
(45) Date of Patent: Dec. 6, 2016

(54) NUMERICAL CONTROL DEVICE WHICH PERFORMS TAPPING OPERATION BY USING A MAIN SPINDLE AND A FEED SHAFT

(75) Inventors: Kenji Nishiwaki, Tokyo (JP); Shuichi Arata, Tokyo (JP); Tomonori Sato, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 101 days.

(21) Appl. No.: 14/384,205

(22) PCT Filed: Jun. 5, 2012

(86) PCT No.: PCT/JP2012/003673
§ 371 (c)(1),
(2), (4) Date: Oct. 21, 2014

(87) PCT Pub. No.: WO2013/183082
PCT Pub. Date: Dec. 12, 2013

(65) Prior Publication Data
US 2015/0081084 A1    Mar. 19, 2015

(51) Int. Cl.
*G05B 19/402* (2006.01)
*G05B 19/416* (2006.01)
*B23G 1/16* (2006.01)

(52) U.S. Cl.
CPC .............. *G05B 19/402* (2013.01); *B23G 1/16* (2013.01); *G05B 19/416* (2013.01);
(Continued)

(58) Field of Classification Search
CPC .............. G05B 19/402; G05B 19/416; G05B 2219/45216; G05B 2219/50225; G05B 2219/43006; B23G 1/16
See application file for complete search history.

(56) References Cited

U.S. PATENT DOCUMENTS 4,879,660 A * 11/1989 Asakura ............... G05B 19/186
                                                  318/39
4,912,385 A *  3/1990 Kawamura ............ B23G 1/16
                                                  318/571
(Continued)

FOREIGN PATENT DOCUMENTS

JP    63-123605 A    5/1988
JP    07-060543 A    3/1995
(Continued)

OTHER PUBLICATIONS

International Search Report of PCT/JP2012/003673 dated Jul. 3, 2012 [PCT/ISA/210].
(Continued)

*Primary Examiner* — Ramesh Patel
(74) *Attorney, Agent, or Firm* — Sughrue Mion, PLLC; Richard C Turner

(57) ABSTRACT

In order to enable tapping to be performed precisely and with an appropriate machining time irrespective of the diameter of a tapping tool, a configuration of the present invention includes: a program analysis unit (12) that analyzes a loaded machining program and extracts thread-related information in tapping; a gradient determination unit (14) that determines acceleration regarding movement velocity of the main spindle or the feed shaft on the basis of the thread-related information obtained by the program analysis unit (12); and an interpolation and acceleration/deceleration processing unit (13) that generates a movement command for the main spindle and the feed shaft using the acceleration determined by the gradient determination unit (14). In addition, the gradient determination unit (14) varies the acceleration during acceleration/deceleration of the main spindle or the feed shaft in accordance with the diameter of a tapping tool.

13 Claims, 4 Drawing Sheets

(52) U.S. Cl.
CPC ............. *G05B 2219/43006* (2013.01); *G05B 2219/45216* (2013.01); *G05B 2219/50225* (2013.01)

(56) References Cited

U.S. PATENT DOCUMENTS

| | | | | |
|---|---|---|---|---|
| 4,941,104 | A | * | 7/1990 | Teshima ............... G05B 19/186 318/567 |
| 4,985,841 | A | * | 1/1991 | Iwagaya ................. B23G 1/16 408/11 |
| 5,184,053 | A | * | 2/1993 | Maruo ................. G05B 19/186 318/39 |
| 5,237,251 | A | * | 8/1993 | Kono ................... G05B 19/186 318/39 |
| 5,307,549 | A | * | 5/1994 | Tsutsumi ............. G05B 19/186 29/27 C |
| 5,358,362 | A | * | 10/1994 | Johnson .................. B23G 1/46 192/21 |
| 5,628,594 | A | * | 5/1997 | Fetty ....................... B23Q 1/70 409/144 |
| 5,654,894 | A | * | 8/1997 | Tsutsui ................. G05B 19/186 318/571 |
| 5,815,400 | A | * | 9/1998 | Hirai .................... G05B 19/401 700/173 |
| 6,029,098 | A | * | 2/2000 | Serizawa ............. G05B 19/416 408/3 |

FOREIGN PATENT DOCUMENTS

| | | |
|---|---|---|
| JP | 07-112322 A | 5/1995 |
| JP | 07-096165 B2 | 10/1995 |
| JP | 2555593 B2 | 11/1996 |
| JP | 11-156638 A | 6/1999 |
| JP | 3117939 U | 1/2006 |
| JP | 4462270 B2 | 5/2010 |

OTHER PUBLICATIONS

Office Action issued on Apr. 27, 2016, by the State Intellectual Property Office of P.R. China in counterpart Chinese Application No. 201280073784.X.

* cited by examiner

| Tool Number | Tool Length | Tool Diameter | ...... |
|---|---|---|---|
| 1 | 100 | 6 | ...... |
| 2 | 120 | 8 | ...... |
| 3 | --- | --- | --- |
| 4 | ...... | ...... | ...... |

Fig. 3

| Thread Shape Information | | | |
|---|---|---|---|
| Pitch (mm) | Nominal Designation of Thread | Major Diameter | Minor Diameter |
| ...... | ...... | ...... | ...... |
| 0.5 | M3 | 3.0 | 2.45 |
| 0.6 | M3.5 | 3.5 | 2.85 |
| 0.7 | M4 | 4.0 | 3.24 |
| 0.8 | M5 | 5.0 | 4.13 |
| 1.0 | M6 | 6.0 | 4.91 |
| 1.0 | M7 | 7.0 | 5.91 |
| 1.25 | M8 | 8.0 | 6.91 |
| ...... | ...... | ...... | ...... |

NUMERICAL CONTROL DEVICE WHICH PERFORMS TAPPING OPERATION BY USING A MAIN SPINDLE AND A FEED SHAFT

CROSS REFERENCE TO RELATED APPLICATIONS

This is a National Stage of International Application No. PCT/JP2012/003673 filed Jun. 5, 2012, the content of all of which is incorporated herein by reference in its entirety.

TECHNICAL FIELD

The invention relates to numerical control devices, and specifically, relates to a numerical control device that controls a machine tool so as to be able to perform tapping by synchronously controlling a main spindle position and a feed shaft position.

BACKGROUND ART

There has long been a demand for high-speed and high-precision machining, and also in tapping, high-speed and high-precision machining is strongly demanded. For high-speed and high-precision tapping, synchronous tapping has been performed by synchronizing the main spindle with the feed shaft, and various proposals have been made as a method for improving the accuracy and the speed of the synchronous tapping.

As an example of a numerical control device that performs tapping, a numerical control device has been disclosed in which an acceleration/deceleration time constant is determined in accordance with the pitch of thread and a peripheral speed, so that an overshoot of the main spindle during high-speed rotation can be avoided and the machining time during low-speed rotation can be shortened (refer to Patent Document 1).

PRIOR ART DOCUMENT

Patent Document

Patent Document 1: Japanese Unexamined Patent Publication No. H07-112322

DISCLOSURE OF THE INVENTION

Problems to be Solved by the Invention

In the conventional numerical control device described above, in a case where the same peripheral speed is set, a time constant is set larger owing to a large rotational frequency of the main spindle when the pitch of thread in a specified tap is small, and the time constant is set smaller when the pitch of thread is large. In the case of the prior art, the time constant is determined by the following equation.

$$T = KPF \quad (1)$$

Here, K represents a constant depending on the maximum rotational frequency and the maximum time constant of the main spindle motor, P represents a pitch-dependent coefficient, and F represents the peripheral speed. After a conversion of the equation, the time constant T finally becomes $$T = kS \quad (2)$$

and the time constant T is proportional to the rotational frequency of the main spindle S. Here, k is a constant. That is, this means that an operation with a constant velocity gradient during acceleration/deceleration is performed, and the control with a constant velocity gradient during acceleration/deceleration is disclosed in Japanese Unexamined Patent Publication No. S63-123605. However, in the literature described above, the time constant is determined by the rotational frequency S of the main spindle, and a cutting load, etc., during tapping is not considered. Therefore, an overload occurs when the tapping is performed with the determined time constant, and thus accurate machining cannot be performed.

In general, when tapping is performed, and in a case where the pitch of thread is larger, i.e., the tool diameter is larger, the cutting load is larger owing to a larger amount of cutting per rotation. Although various factors affect the cutting load torque during tapping, such as the degree of the cutting angle of a tap, a work material, and the size of the diameter of a prepared hole, it is generally known that the cutting torque is proportional to the cube of the major tap diameter. Further, the upper limit torque of a motor in a drive unit is fixed, and the remaining torque obtained by subtracting the cutting torque in tapping from the maximum torque of the motor can be used as the torque during acceleration/deceleration. Thus, in a case where tapping is performed for various tap diameters, the velocity gradient during acceleration/deceleration should be set small when the tap diameter is large, and when the tapping is performed for a small tap diameter with the setting of the gradient unchanged, a problem arises that the machining time becomes longer. In addition, a problem arises that machining accuracy is deteriorated when tapping is performed for a large tap diameter with the setting of the gradient for a small tap diameter.

The present invention has been made to overcome the problems described above, and to provide a numerical control device that can perform tapping precisely and with an appropriate machining time, irrespective of the size of the diameter of a tapping tool.

Means for Solving the Problems

In order to overcome the problem described above, a numerical control device according to the present invention, which performs tapping by synchronizing a movement of the main spindle and a movement of the feed shaft, includes a program analysis unit in which a loaded machining program is analyzed and thread-related information on tapping is extracted; a gradient determination unit that determines acceleration in terms of movement velocity of the main spindle and the feed shaft on the basis of the thread-related information obtained by the program analysis unit; and an interpolation and acceleration/deceleration processing unit that generates a movement command for the main spindle and the feed shaft using the acceleration determined by the gradient determination unit, wherein the gradient determination unit varies the acceleration during acceleration/deceleration of the main spindle and the feed shaft in accordance with the diameter of a tapping tool.

Further, in the numerical control device according to the present invention, the thread-related information is any one of a tool number, a nominal designation of thread, and a pitch of thread; and the gradient determination unit obtains the diameter of the tapping tool on the basis of any one of the tool number, the nominal designation of thread, and the pitch of thread.

Still further, in the numerical control device according to the present invention, the gradient determination unit obtains cutting load torque on the basis of the diameter of the tapping tool, and determines the acceleration based on the torque gained by subtracting the obtained cutting load torque from the maximum torque of a motor.

Furthermore, the numerical control device according to the present invention includes a synchronization error operation unit that calculates an synchronization error during tapping on the basis of detected positional information obtained from the main spindle drive unit and the feed shaft drive unit; and a gradient adjustment unit that, if the synchronization error obtained in the synchronization error operation unit is larger than an allowable value, makes an adjustment in the direction of decreasing the acceleration calculated in the gradient determination unit.

Moreover, the numerical control device according to the present invention includes a synchronization error operation unit that calculates an synchronization error during tapping on the basis of detected positional information obtained from the main spindle drive unit and the feed shaft drive unit; and a gradient adjustment unit that, if the synchronization error obtained in the synchronization error operation unit is smaller than an allowable value, makes an adjustment in the direction of increasing the acceleration calculated in the gradient determination unit.

Effect of the Invention

According to the present invention, tapping can be performed precisely and with an appropriate machining time, irrespective of the size of the diameter of a tapping tool.

Further, according to the present invention, since an acceleration correction is made, tapping can be performed precisely and with an appropriate machining time, irrespective of the size of the diameter of a tapping tool.

Furthermore, according to the present invention, not by simply correcting the acceleration, but by correcting the acceleration only in the case where tapping can be performed precisely and with an appropriate machining time, tapping can be performed precisely and with a more appropriate machining time, and moreover, making an acceleration correction leads to avoid deterioration in machining accuracy and an increase of the machining time.

BRIEF DESCRIPTION OF THE DRAWINGS

FIG. 3 shows an example of thread shape information held in the storage unit of the numerical control device according to Embodiment 1 of the invention;

FIG. 4 shows an example of a machining program according to Embodiment 1 of the invention;

BEST MODES FOR CARRYING OUT THE INVENTION

Embodiment 1

Figures 1, 2:
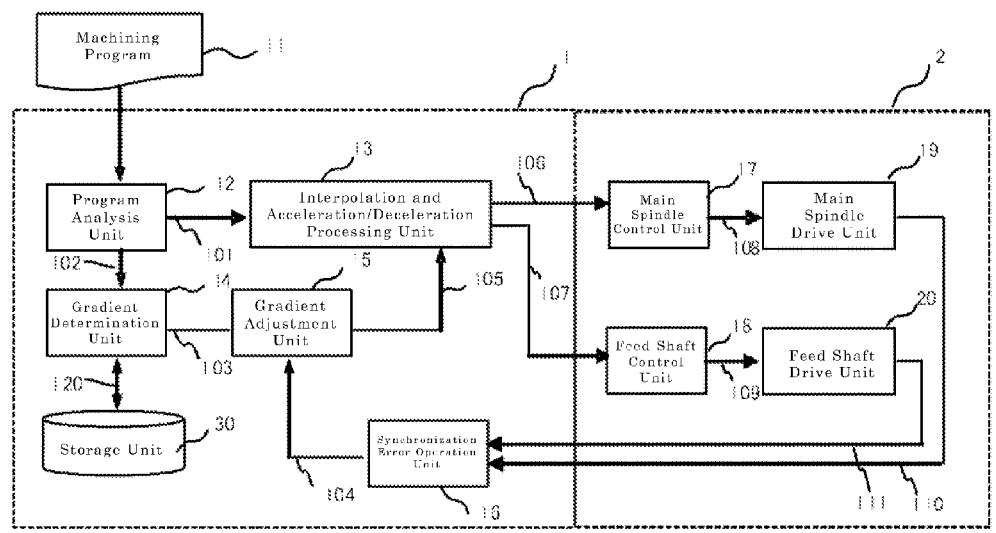
FIG. 1 is a block diagram showing a configuration example of a numerical control system according to Embodiment 1 of the invention.
FIG. 2 shows an example of tool shape information held in a storage unit of a numerical control device according to Embodiment 1 of the invention.
Figure 5:
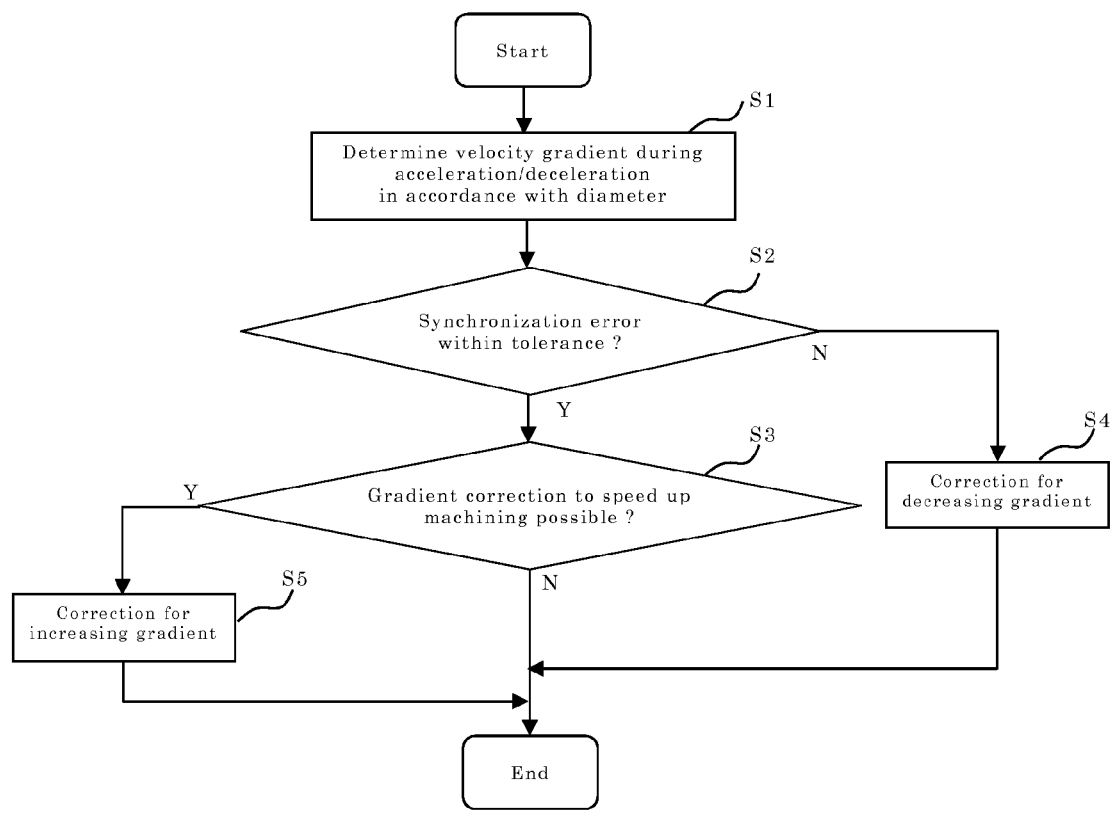
FIG. 5 is a flowchart showing an operation of the numerical control device according to Embodiment 1 of the invention.

Hereinafter, Embodiment 1 of the present invention will be described using FIGS. 1 through 6. FIG. 1 is a block diagram showing a configuration of a numerical control system according to Embodiment 1 of the invention, where numeral 1 denotes a numerical control device, and numeral 2 denotes a drive unit. Numeral 12 denotes a program analysis unit in which a machining program 11 is loaded and analyzed, and a tool number and thread-related information such as a nominal designation of thread and a pitch of thread in tapping are taken out.

Numeral 30 denotes a storage unit in which thread information and inherent information on a main spindle motor and a feed shaft motor, etc., are stored, which are needed in order to determine acceleration during acceleration/deceleration of the main spindle and the feed shaft in a gradient determination unit 14 that will be described later. The thread information is such information as tool shape information, thread shape information, and cutting load information. The tool shape information is a tool shape and its dimension corresponding to the tool number, at least including information on the tool diameter, as shown in FIG. 2, and for example, indicates the tool diameter, the tool length, or a material of the tool, a type and a shape of the tool, an abrasion amount and an operating time of the tool, etc. Further, thread shape information is a thread shape and its dimension corresponding to a nominal designation of thread, at least including information on a pitch of thread, as shown in FIG. 3, and indicates, for example, a pitch of thread, a major diameter and a minor diameter of thread, a thread overlap, the number of turns of flight, and the nominal designation of thread. Moreover, cutting load information is information for determining a coefficient regarding a cutting load, and for example, indicates a half angle of thread, a specific work material cutting resistance which is a coefficient of cutting resistance caused by a work material, a correction coefficient determined by a tap shape and a work material, and a coefficient of cutting resistance caused by chips. Note that, information of a tool administration function that is essential for a numerical control device is used (diverted) as the tool shape information shown in FIG. 2. In addition, the tool shape information is inputted from a screen or a machining program by the tool administration function. Also, an example of thread shape information shown in FIG. 3 shows a case of a standard thread being a metric coarse thread (JIS B0205).

Furthermore, numeral 14 denotes a gradient determination unit that determines the acceleration during acceleration/deceleration of the main spindle and the feed shaft with reference to the tool diameter (major tap diameter) stored in the storage unit 30, on the basis of the thread-related information such as the tool number and the nominal designation of thread, which are obtained in the program analysis unit 12. Numeral 16 denotes a synchronization error operation unit that calculates a synchronization error on the basis of feedback information (detected positional information) from detectors in the main spindle motor and the feed shaft motor of the drive unit 2, and an absolute value of the difference between movement command values and the positional information detected by the detectors is obtained as a synchronization error. Numeral 15 denotes a gradient adjustment unit that adjusts the acceleration during acceleration/deceleration on the basis of the synchronization error calculated in the synchronization error operation unit 16 and the acceleration during acceleration/deceleration obtained by the gradient determination unit 14. Numeral 13 is an interpolation and acceleration/deceleration processing unit that generates movement commands for the main spindle motor and the feed shaft motor by the use of a machining command analyzed in the program analysis unit 12 and the acceleration during acceleration/deceleration adjusted by the gradient adjustment unit 15.

Numeral 17 denotes a main spindle control unit that receives a movement command generated in the interpolation and acceleration/deceleration processing unit 13 and applies an electrical current into a main spindle drive unit 19 including the main spindle motor and the detector. Numeral 18 is a feed shaft control unit that receives a movement command generated in the interpolation and acceleration/deceleration processing unit 13 and applies an electrical current into a feed shaft drive unit 20 including the feed shaft motor and the detector. Note that, a hardware configuration of the numerical control device 1 is the same as that of a general numerical control device including a CPU and memory, etc. Further, the program analysis unit 12, the interpolation and acceleration/deceleration processing unit 13, the gradient determination unit 14, the gradient adjustment unit 15, and the synchronization error operation unit 16 are including software. Furthermore, a hardware configuration of the drive unit 2 is the same as that of a general drive unit including a CPU and memory, etc.

Numeral 101 denotes a machining command analyzed in the program analysis unit 12. Numeral 102 denotes thread-related information such as the tool number, the nominal designation of thread, and the pitch of thread in tapping obtained in the program analysis unit 12, and 103 denotes the acceleration during acceleration/deceleration determined in the gradient determination unit 14. Numeral 104 denotes the synchronization error information calculated in the synchronization error operation unit 16, and numeral 105 denotes the acceleration during acceleration/deceleration that is adjusted in the gradient adjustment unit 15. Numeral 106 denotes a movement command for the main spindle motor generated in the interpolation and acceleration/deceleration processing unit 13, and numeral 107 denotes a movement command for the feed shaft motor generated in the interpolation and acceleration/deceleration processing unit 13. Numeral 108 denotes an electrical current applied from the main spindle control unit 17 into the main spindle drive unit 19; numeral 109 denotes an electrical current from the feed shaft control unit 18 into the feed shaft drive unit 20; numeral 110 denotes feedback position and velocity information from the detector and torque information in the actual machining at the main spindle drive unit 19; numeral 111 denotes feedback position and velocity information from the detector and torque information in the actual machining at the feed shaft drive unit 20; and numeral 120 denotes the thread information.

The numerical control system according to Embodiment 1 is configured as described above, and operates as shown in FIG. 5. First, in step S1 of FIG. 5, the gradient determination unit 14 determines a velocity gradient during acceleration/deceleration in accordance with the tool diameter (major tap diameter). Specifically, the gradient determination unit 14 determines the velocity gradient during acceleration/deceleration in accordance with the tool diameter (major tap diameter) as follows. That is, when a machining program 11 including, for example, a tapping command (G84 command) shown in FIG. 4 is loaded, the program analysis unit 12 analyzes it, and then extracts a tool number (T2) to be used. The gradient determination unit 14 obtains the tool diameter from the tool shape information shown in FIG. 2 on the basis of the extracted tool number. For example, if the tool number is T2, the tool diameter 8 mm is obtained. Note that, the machining program shown in FIG. 4 is as follows. That is, T2 designates the tool number 2; M6 is a command for a tool change to the tool number 2; S3000 is a command for the rotational frequency of the main spindle (3000 rpm); G84 is the tapping command; X, Y, and Z are commands for the positions of tapping (X0, Y0, Z-30); and F is a command for the pitch (1.25). In addition, in a case where the tool diameter is directly designated at or before the tapping command of the machining program 11, the gradient determination unit 14 can obtain the tool diameter without reference to the tool shape information shown in FIG. 2.

Furthermore, if the tool diameter is not set in the tool shape information as shown in the tool number 3 of FIG. 2, the program analysis unit 12 extracts the pitch of thread (F1.25) from the machining program 11 of FIG. 4, and the gradient determination unit 14 obtains the major diameter (8 mm) of the thread from the thread shape information shown in FIG. 3 on the basis of the extracted thread pitch, and then the major diameter is to be regarded as the tool diameter. Also in the machining program 11 shown in FIG. 4, in a case where not the pitch of thread, but the nominal designation of thread is instructed as the thread shape information (not shown, for example, in a case where the nominal designation of thread M8 is instructed), the program analysis unit 12 extracts the nominal designation of the thread (M8) from the machining program 11 of FIG. 4, and the gradient determination unit 14 obtains the major diameter of thread (8 mm) from the thread shape information shown in FIG. 3 on the basis of the extracted nominal designation of the thread, and then the major diameter is to be regarded as the tool diameter. Further, in the machining program 11 shown in FIG. 4, in a case where the thread shape information such as the nominal designation of thread and the pitch of thread is not instructed, the program analysis unit 12 calculates the pitch of thread using the rotational frequency of the main spindle and feed velocity, etc. that are instructed in the machining program 11, and the gradient determination unit 14 obtains the major diameter of thread from the thread shape information shown in FIG. 3 on the basis of the calculated pitch of thread, and then the major diameter is to be regarded as the tool diameter.

Note that, when the gradient determination unit 14 obtains the major diameter of thread from the extracted (or calculated) pitch of thread on the basis of the thread shape information of FIG. 3, there exists a case where a plurality of major diameters of thread may be obtained from the same pitch of thread, for example, as shown in the pitch of thread "1.0" in FIG. 3. Although any one of the plurality of major diameters obtained may be selected, a larger one of the major diameters is selected in the present embodiment. A larger cutting load is calculated in the gradient determination unit 14 by selecting a larger major diameter of thread, so that the velocity gradient during acceleration/deceleration becomes smaller and accuracy can be secured. Furthermore, in a case where the thread shape information such as the nominal designation of thread and the pitch of thread is designated in the machining program 11 shown in FIG. 4, or in a case where, although the thread shape information such as the nominal designation of the thread and the pitch of thread is not designated in the machining program 11 shown in FIG. 4, the program analysis unit 12 can obtain the pitch of thread by calculation using the rotational frequency of the main spindle and the feed velocity, etc. that are instructed in the machining program 11, the tool shape information shown in FIG. 2 does not need to be stored in the storage unit 30 since the major diameter of thread (tool diameter) can be obtained from the thread shape information shown in FIG. 3.

The gradient determination unit 14 that obtains the tool diameter (major tap diameter) as described above obtains the acceleration of the main spindle on the basis of the obtained tool diameter from a table (not shown) for obtaining the acceleration of the main spindle in accordance with a tool diameter. In addition, in order to obtain more precise acceleration, the velocity during acceleration/deceleration of the main spindle can be obtained from tap cutting torque as follows. That is, the cutting torque during tapping is calculated by the following equation (3) using the obtained tool diameter (major tap diameter), a cutting load coefficient, and a prepared hole diameter of a tap.

$$Tq = Kq \times (D-Do)^2 \times (D+2Do) \quad (3)$$

Here, Tq represents the cutting torque; Kq a cutting load coefficient; D the major diameter; Do the prepared hole diameter. The cutting load coefficient is loaded from the storage unit 30, and since drilling is carried out in advance in the case of the tapping command, the prepared hole diameter is obtained by calculation based on the tool shape information in the case of drilling, which is obtained from the program analysis unit 12. Note that, if information on the drilling cannot be obtained, the prepared hole diameter can be obtained by the use of an allowable limit of minor diameter of an internal thread stored in the storage unit 30 or by calculation using the following equation if the percentage of thread engagement is set.

$$Du = D - Ku \times P \times H \quad (4)$$

Here, Du represents the prepared hole diameter; D the major diameter; Ku a coefficient for calculating the percentage of thread engagement; P the pitch of thread; and H the percentage of thread engagement.

The gradient determination unit 14 that obtains the cutting torque Tq during tapping as described above subtracts the calculated cutting torque of the tap, on the basis of information such as inertia inherent in the main spindle motor, from the maximum torque of the main spindle motor, and then determines acceleration of the main spindle that can be realized with the remaining torque. Note that, since the acceleration of the feed shaft is influenced by the acceleration of the main spindle, the acceleration of the feed shaft is determined so as to match a synchronization ratio defined in relation with the main spindle. As described above, in step S1 of FIG. 5, the velocity gradient during acceleration/deceleration is obtained in accordance with the tool diameter (major tap diameter). The determined information on the velocity during acceleration/deceleration is outputted to the interpolation and acceleration/deceleration processing unit 13 via the gradient adjustment unit 15, and the interpolation and acceleration/deceleration processing unit 13 generates movement command information for the main spindle motor and the feed shaft motor in which predetermined acceleration/deceleration controls are carried out on the basis of the information, and outputs the information to the main spindle control unit 17 and the feed shaft control unit 18. The predetermined acceleration/deceleration controls are carried out in the main spindle motor and the feed shaft motor on the basis of the output of the main spindle control unit 17 and the feed shaft control unit 18. If the major tap diameter is large, the cutting load torque is large, so that upper limit torque that can be used during acceleration/deceleration by the main spindle motor decreases, leading to a small velocity gradient during acceleration/deceleration. In contrast, if the major tap diameter is small, the cutting load torque is small, so that the torque that can be used during acceleration/deceleration increases, and the velocity gradient during acceleration/deceleration can be made large.

Figure 6:
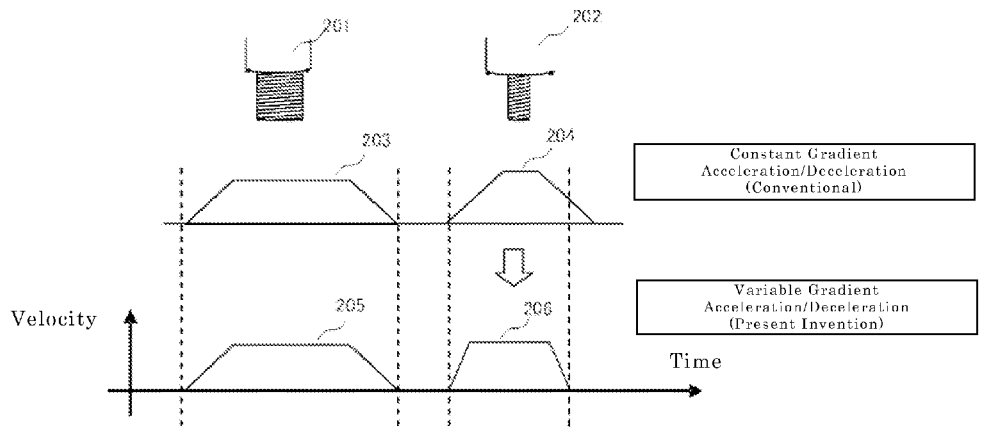
FIG. 6 is a diagram for an explanation of an effect in Embodiment 1 of the invention.

FIG. 6 is a comparison chart between the velocity waveform during acceleration/deceleration under a control of a constant velocity gradient during acceleration/deceleration in Patent Document 1, etc., and the velocity waveform according to Embodiment 1 of the present invention. In a case where tapping is carried out using such a large diameter tool indicated by numeral 201, the velocity waveform is assumed to be the one indicated by numeral 203 where an overload of the motor is avoided. Under a setting of the gradient for the large diameter during tapping, when tapping is carried out using such a small diameter tool indicated by numeral 202 and an operation with a constant velocity gradient during acceleration/deceleration is performed, the velocity waveform becomes that indicated by numeral 204 having the same gradient as that of numeral 203. In contrast, in the case of the acceleration/deceleration method of the present invention, the gradient in the case of the large diameter tool 201 is different from that in the case of the small diameter tool 202, and the cutting load torque in the small diameter tool 202 is smaller than that in the case of the large diameter tool 201, and then a larger acceleration can be set during acceleration/deceleration, so that the machining time is shortened while the machining accuracy is maintained, compared with the conventional method of the constant velocity gradient during acceleration/deceleration.

Incidentally, when the main spindle motor and the feed shaft motor are controlled using the gradient (acceleration) calculated in the gradient determination unit 14, and if the cutting load is larger than the calculated value due to different cutting conditions (for example, cutting load is increased depending on various causes such as diameter variation in each tool, tool abrasion due to machining, clogging of chips, and a spreading way of cutting oil), there may be a case where synchronization accuracy cannot be secured. In contrast, if the cutting load is smaller than the calculated value, even though it is possible to shorten the machining time while maintaining the machining accuracy, there may be some cases where the machining time is longer. In order to improve the situation, the gradient adjustment unit 15 and the synchronization error operation unit 16 perform operations of step S2~step S5 of FIG. 5 and adjust the velocity gradient during acceleration/deceleration to an optimum value. That is, when tapping starts, in step S1, the gradient determination unit 14 obtains a velocity gradient (acceleration) during acceleration/deceleration on the basis of the thread information, and tapping is performed using the obtained acceleration. In the case of the tapping, the synchronization error operation unit 16, receives the detected positional information in the main spindle motor and the feed shaft motor in the drive unit 2, determines whether the synchronization error is equal to or smaller than a predetermined tolerance, and then the result is outputted to the gradient adjustment unit 15 (step S2). Here, the synchronization error operation unit 16 calculates a difference between the position of the main spindle and the position of the feed shaft, and the absolute value of the difference between the position of the main spindle and the position of the feed shaft is outputted. Further, regarding the tolerance, a user can set the value of the allowable error. In addition, in a case where the allowable error is not predetermined, although it is not particularly described in a table, a tolerance of a standard dimension of thread, etc., is assumed to be used. In step S2, if the synchronization error is not within the tolerance, the process proceeds to step S4, and the gradient adjustment unit 15 performs a correction of the gradient so as to decrease the acceleration.

In contrast, if the synchronization error is within the allowable value, the process proceeds to step S3. In step S3, a decision is made on whether or not the acceleration can be further increased in order to shorten the machining time. Note that, the decision is made in such a way that the torque during actual machining is obtained from the drive units 19 and 20, and comparison is made between the obtained torque and the calculated torque described before. If the torque during actual machining is smaller than the calculated torque and the acceleration can be increased, the process proceeds to step S5 and a correction is made to increase the acceleration. In the step S3, if the decision is made such that the acceleration cannot be further increased, that is, an optimum velocity gradient during acceleration/deceleration is obtained, tapping is performed. An optimum acceleration can be obtained by repeating the calculation cycle at every tapping command or for every tapping hole. Thus, not by simply correcting the acceleration, but by correcting the acceleration only in the case where tapping can be performed with an appropriate machining time and with sufficient accuracy, tapping can be performed precisely and with a more appropriate machining time, and moreover, making an acceleration correction leads to avoid deterioration in machining accuracy and an increase of the machining time.

Embodiment 2

Figure 7:
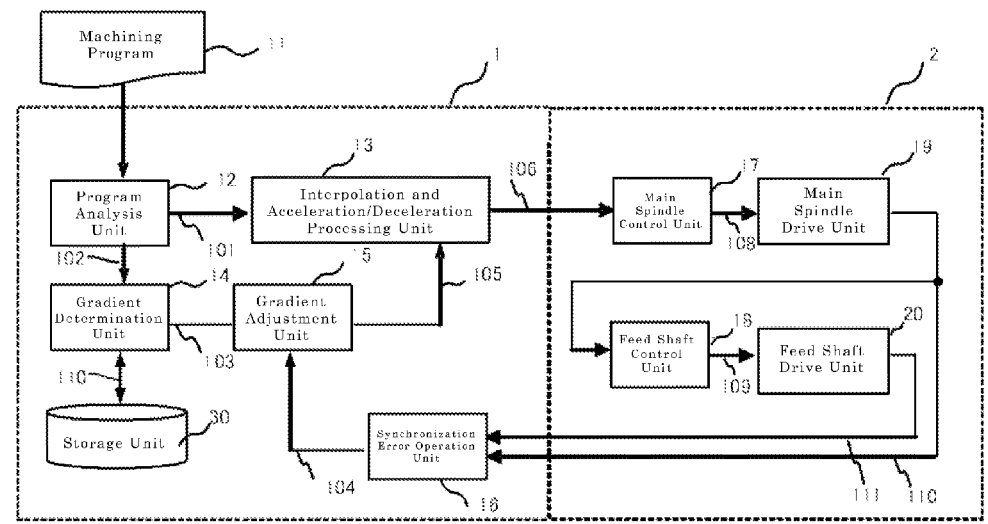
FIG. 7 is a block diagram showing a configuration example of a numerical control system according to Embodiment 2 of the invention.

Note that, although a system is described in Embodiment 1 in which the interpolation and acceleration/deceleration processing unit 13 outputs the movement commands for the main spindle motor and the feed shaft motor, the present invention is applicable to a master-slave numerical control system in which, as shown in FIG. 7, the interpolation and acceleration/deceleration processing unit 13 outputs only the movement command for the main spindle motor, and the feed control unit 18 determines an electric current to be applied to the feed drive unit 20 on the basis of the feedback information on the position and the velocity outputted from the detector of the main spindle drive unit 19.

Embodiment 3

Further, in Embodiment 1, a system including the gradient adjustment unit 15 having the following configuration has been described. That is, if the synchronization error obtained in the synchronization error operation unit 16 is larger than the allowable synchronization error, an adjustment is made in the direction of decreasing the acceleration calculated in the gradient determination unit 14. If the synchronization error is within the allowable synchronization error, a decision is made on whether or not an adjustment can be made in the direction of increasing the acceleration calculated in the gradient determination unit 14. If the adjustment can be made in the direction of increasing the acceleration calculated in the gradient determination unit 14, the adjustment is made in the direction of increasing the acceleration calculated in the gradient determination unit 14. And if the adjustment cannot be made in the direction of increasing the acceleration calculated in the gradient determination unit 14, the acceleration calculated in the gradient determination unit 14 remains unchanged. However, for the gradient adjustment unit 15, a configuration may be possible in which if the synchronization error obtained in the synchronization error operation unit 16 is larger than the allowable value, an adjustment is made in the direction of decreasing the acceleration calculated in the gradient determination unit 14, and if the synchronization error obtained is smaller than the allowable value, an adjustment is made in the direction of increasing the acceleration calculated in the gradient determination unit 14. Even in such a configuration, tapping can be performed precisely and with a more appropriate machining time, irrespective of the size of the diameter of a tapping tool.

INDUSTRIAL APPLICABILITY

The numerical control device according to the present invention is suitable for performing tapping in which reduction in machining time is desired while maintaining machining accuracy.

EXPLANATION OF REFERENCE CHARACTERS 1 numerical control device, 2 motor drive unit, 11 machining program, 12 program analysis processing unit, 13 interpolation and acceleration/deceleration processing unit, 14 gradient determination unit, 15 gradient adjustment unit, 16 synchronization error operation unit, 17 feed shaft control unit, 18 main spindle control unit, 19 feed shaft drive unit, 20 main spindle drive unit, 30 storage unit, 101 machining command, 102 thread-related information, 103 gradient information on main spindle and feed shaft (acceleration during acceleration/deceleration), 104 synchronization error information, 105 adjusted gradient information on main spindle and feed shaft (acceleration during acceleration/deceleration), 106 movement command information on main spindle motor, 107 movement command information on feed shaft, 108 electric current information on main spindle, 109 electric current information on feed shaft, 110 feedback information on position and velocity of main spindle, 111 feedback information on position and velocity of feed shaft, 120 thread information, 201 large diameter tool, 202 small diameter tool, 203 constant gradient acceleration/deceleration velocity waveform for large diameter tool, 204 constant gradient acceleration/deceleration velocity waveform for small diameter tool, 205 variable gradient acceleration/deceleration velocity waveform for large diameter tool, 206 variable gradient acceleration/deceleration velocity waveform for small diameter tool.

The invention claimed is:

1. A numerical control device that controls a main spindle and a feed shaft, the numerical control device comprising:
   a program analyzer that analyzes a loaded machining program and extracts thread-related information on tapping;
   a gradient determiner that determines acceleration corresponding to a rate of change of a movement velocity of the main spindle and the feed shaft based on the extracted thread-related information; and
   an interpolation and acceleration/deceleration processor that generates a movement command for the main spindle and the feed shaft based on the acceleration determined by the gradient determiner,
   wherein the gradient determiner varies the acceleration in accordance with a diameter of a tapping tool during acceleration of the main spindle or the feed shaft or deceleration of the main spindle or the feed shaft.

2. The numerical control device according to claim 1, wherein
   the thread-related information is one of a tool number, a nominal designation of thread, and a pitch of thread; and the gradient determiner obtains the diameter of the tapping tool on the basis of one of the tool number, the nominal designation of thread, and the pitch of thread.

3. The numerical control device according to claim 2, wherein the gradient determiner obtains cutting load torque on the basis of the diameter of the tapping tool, and determines the acceleration based on the torque gained by subtracting the obtained cutting load torque from the maximum torque of a motor.

4. The numerical control device according to claim 3, further comprising:
a synchronization error operator that calculates a synchronization error during tapping on the basis of detected positional information obtained from the main spindle driver and the feed shaft driver; and
a gradient adjuster that, if the synchronization error obtained in the synchronization error operator is greater than an allowable value, decreases the acceleration calculated in the gradient determiner.

5. The numerical control device according to claim 3, further comprising:
a synchronization error operator that calculates a synchronization error during tapping on the basis of detected positional information obtained from the main spindle driver and the feed shaft driver; and
a gradient adjuster that, if the synchronization error obtained in the synchronization error operator is less than an allowable value, increases the acceleration calculated in the gradient determiner.

6. The numerical control device according to claim 2, further comprising:
a synchronization error operator that calculates a synchronization error during tapping on the basis of detected positional information obtained from the main spindle driver and the feed shaft driver; and
a gradient adjuster that, if the synchronization error obtained in the synchronization error operator is greater than an allowable value, decreases the acceleration calculated in the gradient determiner.

7. The numerical control device according to claim 2, further comprising:
a synchronization error operator that calculates a synchronization error during tapping on the basis of detected positional information obtained from the main spindle driver and the feed shaft driver; and
a gradient adjuster that, if the synchronization error obtained in the synchronization error operator is less than an allowable value, increases the acceleration calculated in the gradient determiner.

8. The numerical control device according to claim 1, wherein the gradient determiner obtains cutting load torque on the basis of the diameter of the tapping tool, and determines the acceleration based on the torque gained by subtracting the obtained cutting load torque from the maximum torque of a motor.

9. The numerical control device according to claim 8, further comprising:
a synchronization error operator that calculates a synchronization error during tapping on the basis of detected positional information obtained from the main spindle driver and the feed shaft driver; and
a gradient adjuster that, if the synchronization error obtained in the synchronization error operator is greater than an allowable value, decreases the acceleration calculated in the gradient determiner.

10. The numerical control device according to claim 8, further comprising:
a synchronization error operator that calculates a synchronization error during tapping on the basis of detected positional information obtained from the main spindle driver and the feed shaft driver; and
a gradient adjuster that, if the synchronization error obtained in the synchronization error operator is less than an allowable value, increases the acceleration calculated in the gradient determiner.

11. The numerical control device according to claim 1, further comprising:
a synchronization error operator that calculates a synchronization error during tapping on the basis of detected positional information obtained from a main spindle driver and a feed shaft driver, and
a gradient adjuster that, if the synchronization error obtained in the synchronization error operator is greater than an allowable value, decreases the acceleration calculated in the gradient determiner.

12. The numerical control device according to claim 1, further comprising:
a synchronization error operator that calculates a synchronization error during tapping on the basis of detected positional information obtained from the main spindle driver and the feed shaft driver; and
a gradient adjuster that, if the synchronization error obtained in the synchronization error operator is less than an allowable value, increases the acceleration calculated in the gradient determiner.

13. The numerical control device according to claim 1, wherein the numerical control device controls the main spindle and the feed shaft to perform tapping while at least one of the main spindle and the feed shaft is accelerated and decelerated.

* * * * *